United States Patent [19]
Garcia

[11] Patent Number: 5,836,150
[45] Date of Patent: Nov. 17, 1998

[54] MICRO THRUST AND HEAT GENERATOR

[75] Inventor: Ernest J. Garcia, Albuquerque, N. Mex.

[73] Assignee: The United States of America as represented by the United States Department of Energy, Washington, D.C.

[21] Appl. No.: 456,993

[22] Filed: May 31, 1995

[51] Int. Cl.⁶ ........................................ F02K 9/08
[52] U.S. Cl. ............................... 60/256; 60/251; 60/253; 60/39.821; 60/39.827
[58] Field of Search ............................. 60/251, 253, 256, 60/39.821, 39.827

[56] References Cited

U.S. PATENT DOCUMENTS

| | | | |
|---|---|---|---|
| 2,760,340 | 8/1956 | Seglum | 60/39.827 |
| 3,136,119 | 6/1964 | Avery | 60/251 |
| 3,156,092 | 11/1964 | Holzman | 60/251 |
| 3,296,802 | 1/1967 | Williams | 60/256 |
| 3,343,366 | 9/1967 | Siegler et al. | 60/39.827 |
| 4,674,319 | 6/1987 | Muller et al. . | |
| 5,025,346 | 6/1991 | Tang et al. . | |
| 5,043,043 | 8/1991 | Howe et al. . | |
| 5,093,594 | 3/1992 | Mehregany . | |
| 5,189,323 | 2/1993 | Carr et al. . | |
| 5,191,251 | 3/1993 | Paratte . | |
| 5,378,583 | 1/1995 | Guckel et al. . | |

OTHER PUBLICATIONS

L. Fan et al., "Integrated Movable Micromechanical Structures of Sensors and Actuators," *IEEE Transactions on Electron Devices*, vol. 35, No. 6, Jun. 1988, pp. 724–730.

W. Tang et al., "Laterally Driven Polysilicon Resonant Microstructures," *Proceedings of IEEE MicroElectroMechanical Systems Workshop*, Feb. 20–22, 1989, pp. 53–59.

M. Mehregany et al., "Friction and Wear in Microfabricated Harmonic Side–Drive Motors," *IEEE Solid State Sensor and Actuator Workshop*, Jun. 4–7, 1990, pp. 17–22.

V. Dhuler et al., "Micromotor Operation in a Liquid Environment," *Proceedings of IEEE Solid–State Sensor an Actuator Workshop*, Jun. 22–25, 1992, pp. 10–13.

H. Guckel et al., "Micromechanics Via X–Ray Assisted Processing," *J. Vac. Sci. Technol. A*, vol. 12, No. 4, Jul./Aug. 1994, pp. 2559–2564.

*Primary Examiner*—Charles G. Freay
*Attorney, Agent, or Firm*—Luis M. Ortiz; James H. Chafin; William R. Moser

[57] ABSTRACT

A micro thrust and heat generator has a means for providing a combustion fuel source to an ignition chamber of the micro thrust and heat generator. The fuel is ignited by a ignition means within the micro thrust and heat generator's ignition chamber where it burns and creates a pressure. A nozzle formed from the combustion chamber extends outward from the combustion chamber and tappers down to a narrow diameter and then opens into a wider diameter where the nozzle then terminates outside of said combustion chamber. The pressure created within the combustion chamber accelerates as it leaves the chamber through the nozzle resulting in pressure and heat escaping from the nozzle to the atmosphere outside the micro thrust and heat generator. The micro thrust and heat generator can be microfabricated from a variety of materials, e.g., of polysilicon, on one wafer using surface micromachining batch fabrication techniques or high aspect ratio micromachining techniques (LIGA).

23 Claims, 7 Drawing Sheets

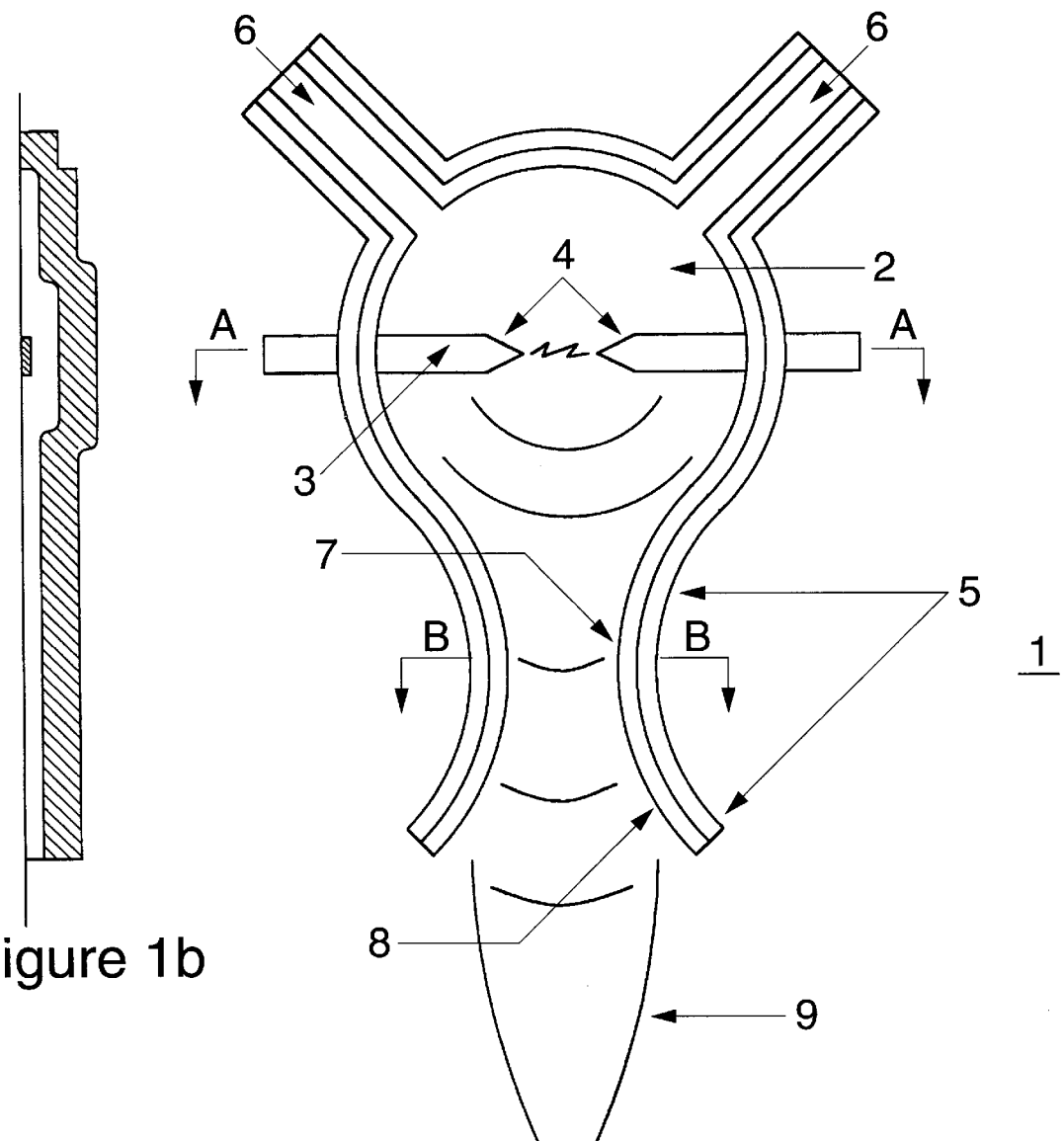

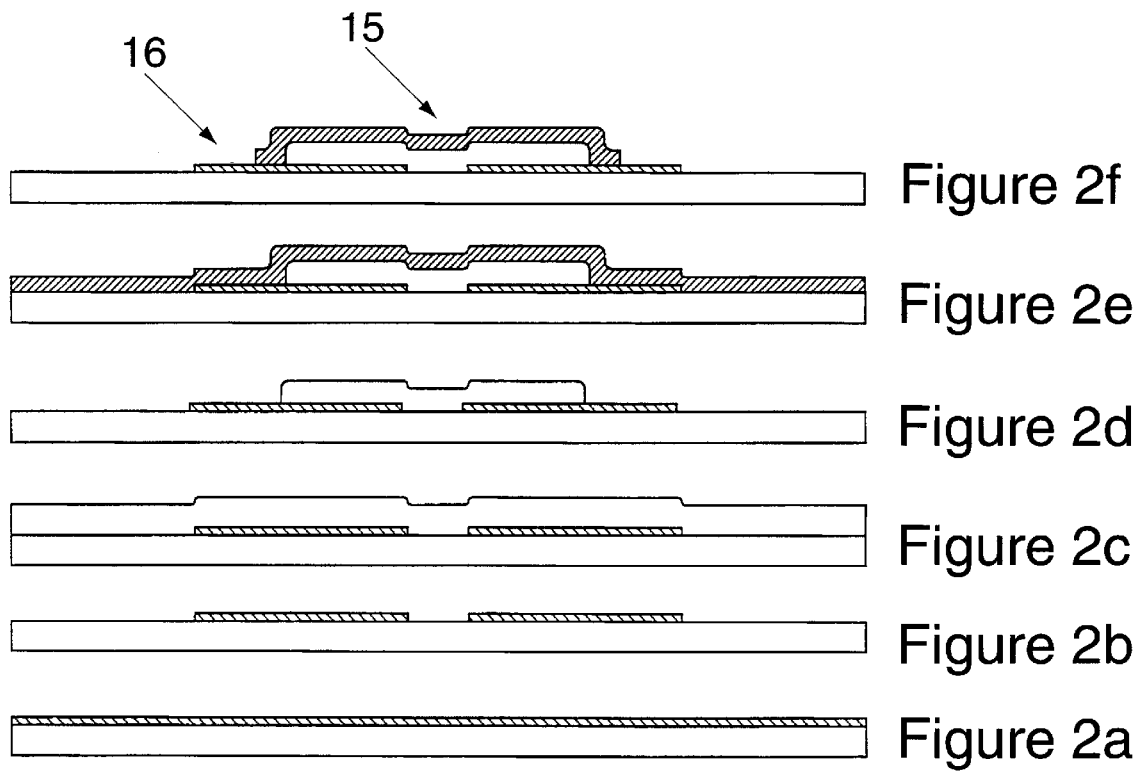

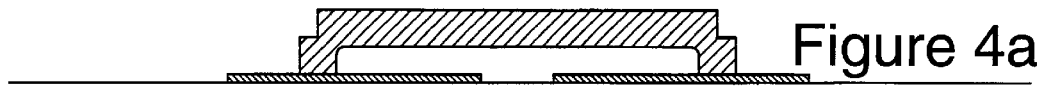
Figure 4a
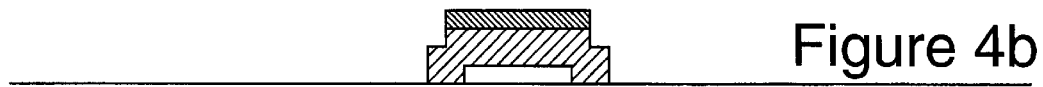
Figure 4b
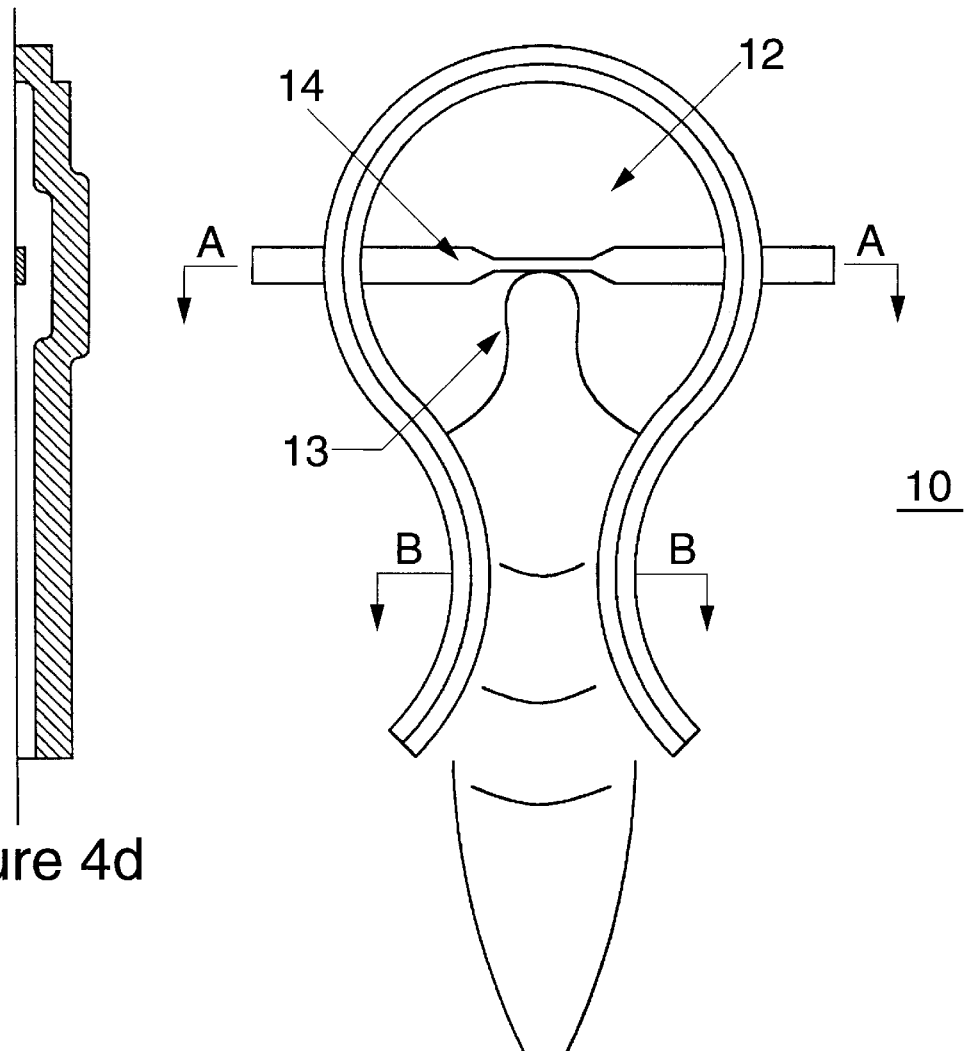
Figure 4d
Figure 4c

MICRO THRUST AND HEAT GENERATOR

The present invention was conceived and developed in the performance of a U.S. Government Contract. The U.S. Government has certain rights in this invention pursuant to contract No. DE-ACO4-94AL85000 between the United States Department of Energy and Sandia Corporation.

FIELD OF THE INVENTION

The present invention relates generally to micromachines such as microengines or micromotors. More specifically, the invention is directed to a means of fabricating a micro rocket for providing as a source of heat and thrust, and utilizes chemical energy to drive or power micromechanical apparatuses. In a domain ranging from tenths of micrometers to thousands of micrometers. The invention is adaptable to applications involving defense, biomedical, manufacturing, consumer product, aviation, automotive, computer, inspection, and safety systems.

BACKGROUND FOR THE INVENTION

In the field of micromechanics, fabricating microsized mechanical devices to provide. Micrometer sized devices which function as a source of heat or thrust as presented in this disclosure do not exist. In the art of micromachines there are micrometer sized micromotors or microengines that display rotational motion in order to drive a mechanical load. These devices are electrically powered. There is an existing need for a micro-sized apparatus that can provide thrust or heat within the microdomain. Such an apparatus can be used to provide thrust to a turbine for electrical power generation which may be used by micromachines such as micromotors or microactuators. There is also a need for a heat source in the microdomain for applications such as surgical cauterizing or explosive detonation. Micro devices that supply a continuous source of heat and thrust can also be used to provide for propulsion of micro systems, for micro positioning or more general driving of micromechanisms, for material removal by selective burning at the micro scale, or to deliver thermal treatments to microscopic sized materials. Such a device has direct applications to a new class of micro detonators for industrial or weapon applications, or as part of an enhanced safety system for such applications.

Generally, fabrication of micro devices begins with a pattern etched in thin films on a silicon substrate by exposing polysilicon, which serves as the structural material through a photoresist mask. By selectively etching sacrificial layers from a multilayer sandwhich of patterned polysilicon films and intervening sacrificial oxide films, and through material deposition and selective removal of these various film layers, highly and specialized micromechanical components are chemically and mechanically fabricated. Therefore, since the complexity and difficulty of fabricating a micromechanical device increases with each subsequent polysilicon and sacrificial layer deposition and removal, the micro thrust and heat generator of the present invention is considered to be fully batch-fabricated and does not rely on the assembly of separately fabricated piece-components of the prior art.

It is therefore an objective of the present invention to fulfill the need for a micro thrust and heat generator that satisfies the needs of the micromachine art by providing a source of thrust and heat within the microdomain.

It is another object of the present invention that the micro thrust and heat generator is made primarily of polysilicon with intervening coatings of silicon nitride for isolation on a single substrate using a fully batch-fabricated polysilicon surface micromachining process.

It is still another object of the present invention that the micro thrust and heat generator comprises a core propulsion system including an ignition chamber, an inlet means for transporting a fuel set to the ignition chamber, an ignition means for providing combustion within the ignition chamber, and a convergent-divergent nozzle means for accelerating and directing the high-flow gas jet to ambient.

It is still a further object of the invention that the components of the micro thrust and heat generator do not result from an assembly of separately fabricated individual parts, but is a fully batch-fabricated micro thrust and heat generator.

SUMMARY OF THE INVENTION

In view of the above-described needs, the present microfabricated micro thrust and heat generator ("micro rocket engine" or "microgenerator"), through a chemical reaction within a combustion chamber, produces a thrust by the escape of heated gases through a nozzle of the microgenerator and serves as a heat source. Fuel, such as oxygen and hydrogen gas, are input through a gas inlet into a combustion chamber of the device in stoichiometric quantities that will support combustion. An ignitor is then operated to start the combustion process within the chamber. Hot expanding gas is then accelerated from within the chamber through a nozzle of the chamber and the exiting "jet" of gas produces a thrust equal to the exit mass flow rate times the exit velocity plus the exit area of the nozzle times the difference in nozzle exit pressure and ambient pressure, i.e.:

$$T = \dot{m}V + A_{exit}(P_{exit} - P_{ambient}).$$

Fuels used in the microgenerator include liquids, gases and solids. The actual size of the micro thrust engine is of the order of less than 100 micrometers.

The microgenerator is fabricated using micromachining techniques. The entire device can be fabricated from polysilicon, silicon nitride, or various electro-platable materials on one wafer using surface micromachining or LIGA (German acronym for "Lithographisch Galvanoformung Abformung") fabrication techniques. The materials used depend upon the specific micromachining process used. Fabrication of the device is accomplished without the need for assembly of multiple wafers requiring alignments, bonding, or the addition of other separately fabricated piece parts.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the operation, features, and advantages of the invention.

FIGS. 1a–1d are an illustration of the microgenerator of the present invention using a liquid or gas source.

FIGS. 2a–2f are an illustration of the fully-batched fabrication process for the micro thrust generator.

FIGS. 4a–4d are an illustration of the microgenerator of the present invention using a solid fuel source.

DETAIL DESCRIPTION OF THE PREFERRED EMBODIMENTS

Figure 3I:
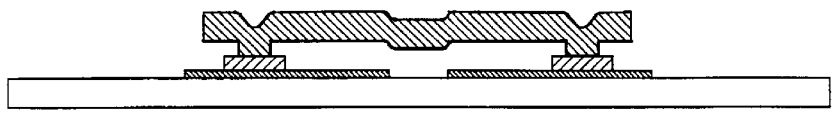
FIGS. 3a–3i are an illustration of the LIGA fabrication process for the microgenerator.
Figure 3H:
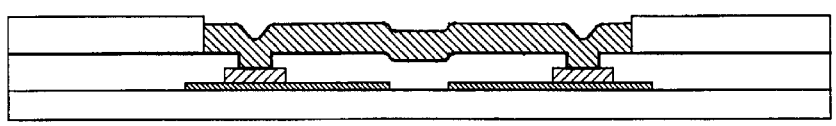
Figure 3G:
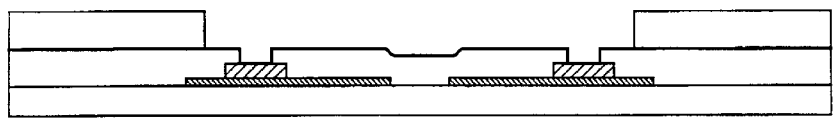
Figure 3F:
Figure 3E:
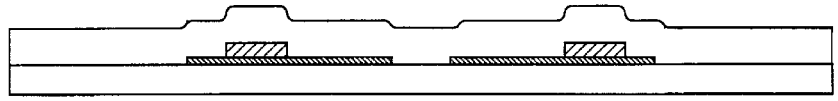
Figure 3D:
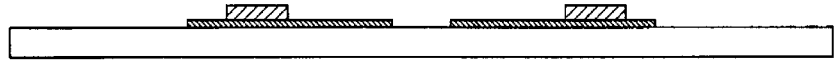
Figure 3C:
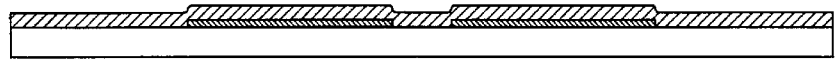
Figure 3B:
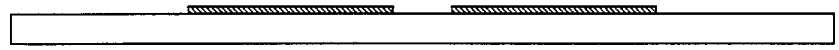
Figure 3A:

Referring to FIG. 1a, the basic micro thrust and heat generator ("microgenerator") is illustrated. The microgenerator 1 has an inlet means 6 (tubing or piping) for providing a combustible fuel source to an ignition chamber 2 of the microgenerator 1. The fuel is ignited by a ignition means 3 also within the microgenerator's ignition chamber 2 where the fuel burns and creates a pressure within the chamber 2. A nozzle 5 formed from the combustion chamber extends outward from the combustion chamber 2 and tappers down to a narrow diameter 7 and then opens into a wider diameter 8 where the nozzle 5 then terminates outside of the combustion chamber 2. The pressure created within the combustion chamber accelerates the gas as it leaves the chamber 2 through the nozzle 5 resulting in gas escaping 9 from the nozzle to the atmosphere outside the microgenerator 1.

Figures 7A, 7B, 7C, 7D:
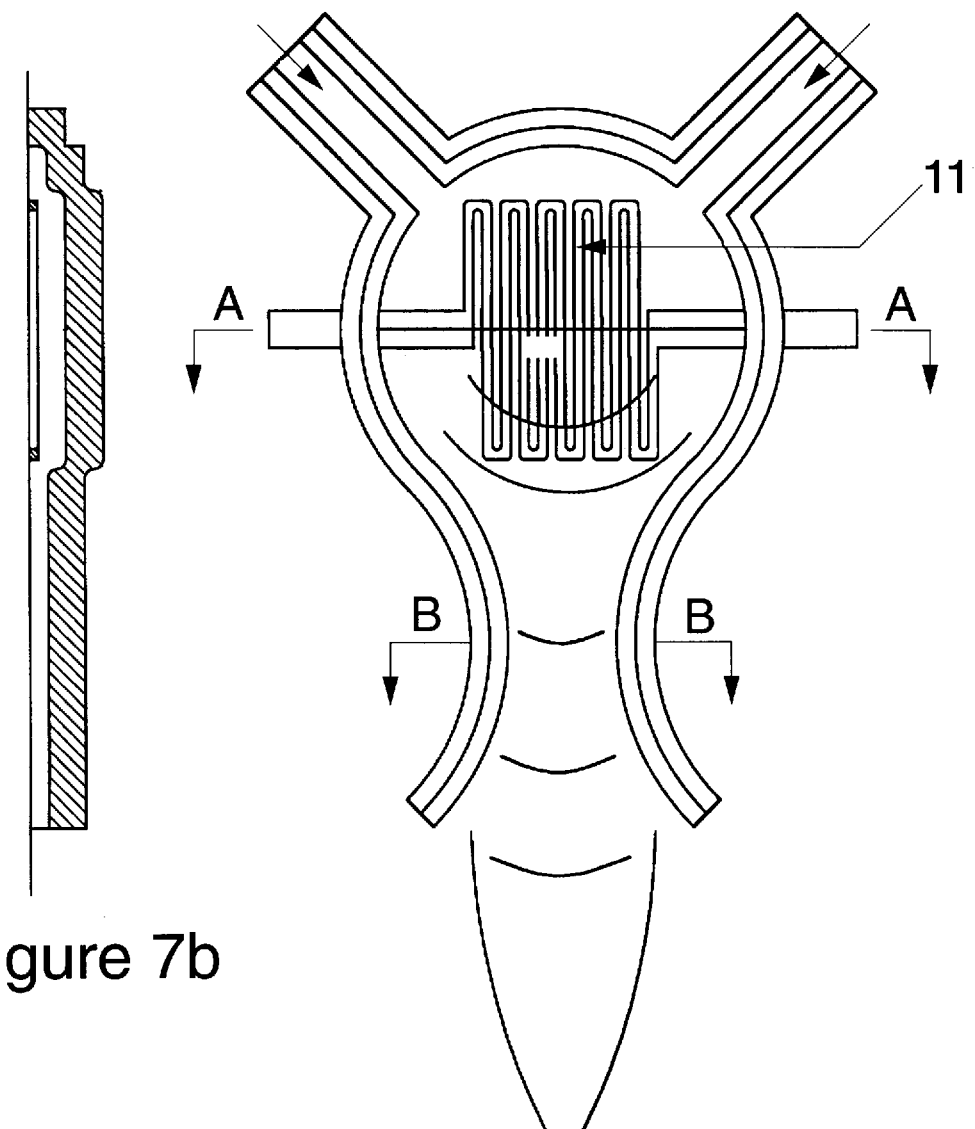
FIGS. 7a–7d are an illustration of the microgenerator of the present invention, in various views, using a glow-plug ignitor.

Ignition of a combustible mixture is started by applying voltage to the ignition element 3, which is sufficient to start electrical breakdown between the sharp electrodes 4 located within the ignition chamber 2. Breakdown voltage is applied at intervals to initiate combustion either in pulses, or in a single continuous mode. The ignitor electrodes 4 shown use a material that is selected to reduce erosion of the tips such as tungsten (W). As ignition commences, the pressure inside the combustion chamber 2 rises and the combusted mixture begins to move through the exhaust nozzle 5. Referring to FIG. 7a, use of a glow-plug-type ignition 11 is illustrated. The glow-plug ignitor 11 uses a platinum catalyst to sustain combustion. An initial current through the platinum coil ignites the fuel/oxidizer mixture. Depending on the fuel/oxidizer mixture ratio and flow rates, the current required to sustain combustion can range from zero amps up to the original current required to start combustion. The platinum glow-plug concept has been successfully used in miniature 2 stroke engines used for powering hobbyist radio controlled airplanes, cars, and boats.

By appropriately designing the nozzle configuration, the flow can be made to accelerate to high velocities. The nozzle can be configured to accelerate the flow to supersonic velocities. A nozzle capable of accelerating the flow to supersonic velocities is illustrated. The specific shape of the exit nozzle determines the gas flow characteristics. As illustrated throughout this disclosure, a converging-diverging nozzle would be used to produce supersonic flow of the exiting gas in microscopic sized rocket engines as described herein.

Fuels used for the microgenerator include liquids, gases, and solids. Gases for combustion would include: methane, propane, hydrogen, etc. Liquid fuels would include: alcohol's, gasoline's, etc. The oxidizer would be utilized by oxygen gas or room air (20% $O_2$). A solid fuel plus oxidizer would be utilized by depositing the solid fuel/oxidizer mixture during processing within the microgenerator structure. Ignition of this solid-fueled device would be started by a built-in resistive heating ignitor—similar to that of a model rocket engine ignitor.

The microgenerator has direct application to a new class of micro detonators for both nuclear and conventional weapons. To initiate detonation, the microgenerator would deliver sufficient energy to the detonator in a weapon to start detonation. This device would be capable of delivering the required energy density to the detonator surface (eg., a detonator component consisting of insensitive high explosive) for ignition. The device would make up part of an enhanced safety system for a nuclear or conventional weapon system and can be retrofittable into existing systems. The safety system would consist of stored combustibles, appropriate micro valving, and the microgenerator which would deliver the required energy density to the surface of the detonator upon command. In an abnormal environment, the stored combustibles could not be combined in the unique fashion required to deliver the necessary energy density. The valving and microgenerator ignitor functions would be controlled by accepted unique signal input controlling functions.

The actual size of the microgenerator is of the order of 100 microns. Fabrication of the microgenerator requires the use of polysilicon surface micromachining techniques which are closely related to the techniques used in integrated circuit fabrication. Surface, bulk, and high aspect ratio micromachining (also known as LIGA) can be used to fabricate the microgenerator. For example: chemical vapor deposition (CVD), physical vapor deposition (PVD), and electroplating processes are used to deposit silicon dioxide, polycrystalline silicon, silicon nitride, silicon carbide, nickel, iron, nickel-iron, tungsten and platinum.

FIG. 2 illustrates the fabrication process for fabricating the device using polysilicone surface micromachining. The process begins as illustrated in FIG. 2a and continues as illustrated through FIG. 2f.

The fabrication process for the micro thrust and heat generator makes use of planar techniques by using polysilicon as the structural material and an oxide as the sacrificial layer. The process begins with a substrate base comprising suitably doped single crystal silicon. The substrate base is cleaned and coated with an insulating layer of oxide and nitride silicon. A layer of tungsten is deposited where it is patterned to form the ignition element as illustrated in FIGS. 2a and 2b within the ignition chamber of the micro thrust and heat generator. The next step involes depositing a thin-film layer of oxide glass (silicon dioxde) which acts to serve as the sacrificial layer (as illustrated in FIG. 2c). The oxide material is patterned by exposing it to HF hydrofluoric acid (or other appropriate etchant) to form the ingnition chamber, convergent-divergent nozzle, and fuel inlet means to said ignition chamber (steps C and D). In the next step, a layer of polysilicon material is deposite where it is patterned by exposure through a postive photoresist mask to ultraviolet light and subsequently etched to form the micro thrust and heat generator structure as depicted in step F. A cross-sectional view of the device 15 which includes the ignition element 16 is shown.

FIG. 3 illustrates the basic LIGA process for fabrication of the device. LIGA (High Aspect Ratio Micromachining) processing of the device entire process as illustrated in FIGS. 3a through 3i follows a similar procedure to the surface micromachining approach except that the structural materials that will form the device are electroplated into molds formed by X-ray exposed photoresist material process as illustrated in FIGS. 3c through 3h, e.g., PMMA (polymethyl methacrylate). U.S. Pat. No. 5,378,583, to Guckel et al. and a paper entitled 'Micromechanics via x-ray assisted processing" by Guckel et al. (published in July/August 1994, J. Vac. Sci. Technol. A, Vol. 12, No. 4) are hereby incorporated by reference as they describe the LIGA process and the use of PMMA as a photoresist. After the electroplating process as illustrated in FIG. 3h the molds are chemically removed and the structural material for the device remains as illustrated in FIG. 3i. It should be noted that the PMMA molds have a similar function to the sacrificial material (oxide) used in the surface micromachining process. Since the electroplated material is conductive, the ignitor element must be electrically isolated from the main structure of the microgenerator by the use of a dielectric layer placed between the ignitor and the chamber structure. Bulk micromachining is used primarily to facilitate the connection of the fuel and oxidizer lines to the chip.

As shown in FIG. 4, the version of the microgenerator 10 which uses a solid fuel/oxidizer 12 is similar to the device of FIG. 1 except that the input lines supplying gas or liquid fuel and oxidizer are not required and the solid fuel/oxidizer can be formed into specific shapes 13 to tailor the burn. The ignitor element 14 is a resistive heating element instead of a spark type ignitor shown in FIG. 1a or glow-plug of FIG. 1b.

Figure 5B:
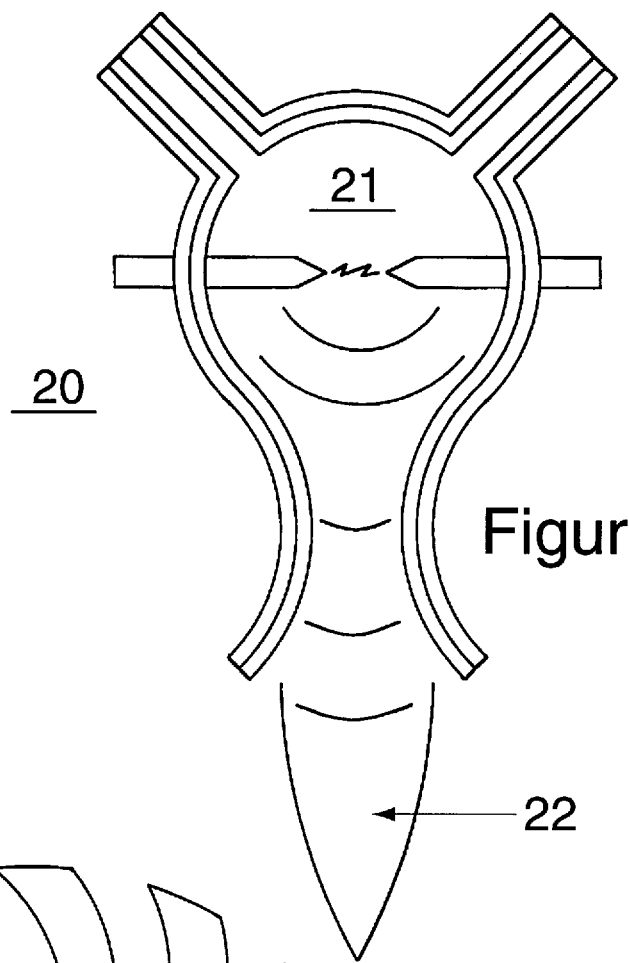
FIGS. 5a–5b are an illustration of the microgenerator used as a micromachined turbo generator.
Figure 5A:
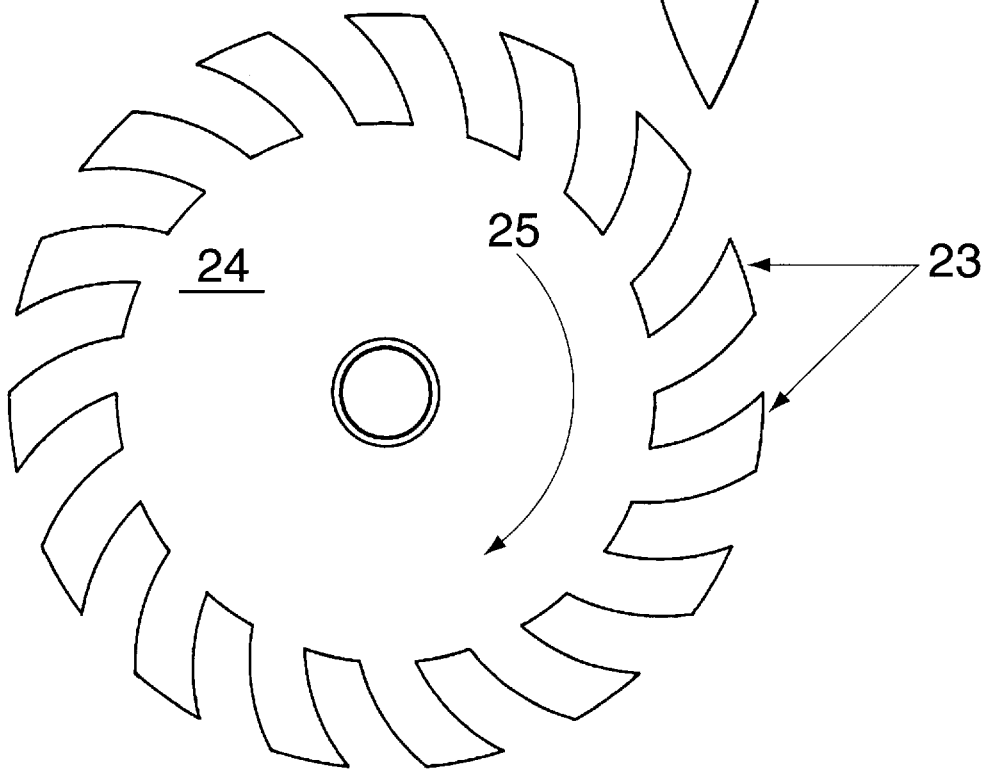

The microgenerator can be used as a thrust source for a micromachined turbo-electric generator as illustrated in FIG. 5. The turbo-electric generator 20 (as illustrated in FIG. 5b)uses the thrust 22 generated by the microgenerator 21 to turn 25 (as illustrated in FIG. 5a) the blades 23 of a micro fabricated turbine 24. This turbine can be configured to form the rotor for an electromagnetic generator. The basic principle illustrated here is that the output from the microgenerator can be harnessed through the turbine to drive either a mechanical load in the form of a micromechanism performing some specific function (e.g., cutting, positioning, etc.) or an electrical load through an electromagnetic generator. The thermo-electric generator could be used to continuously power remotely operated devices or serve as a micro battery for remotely operated sensors, probes, or other microscopic electronic or electromechanical systems.

Figure 6:
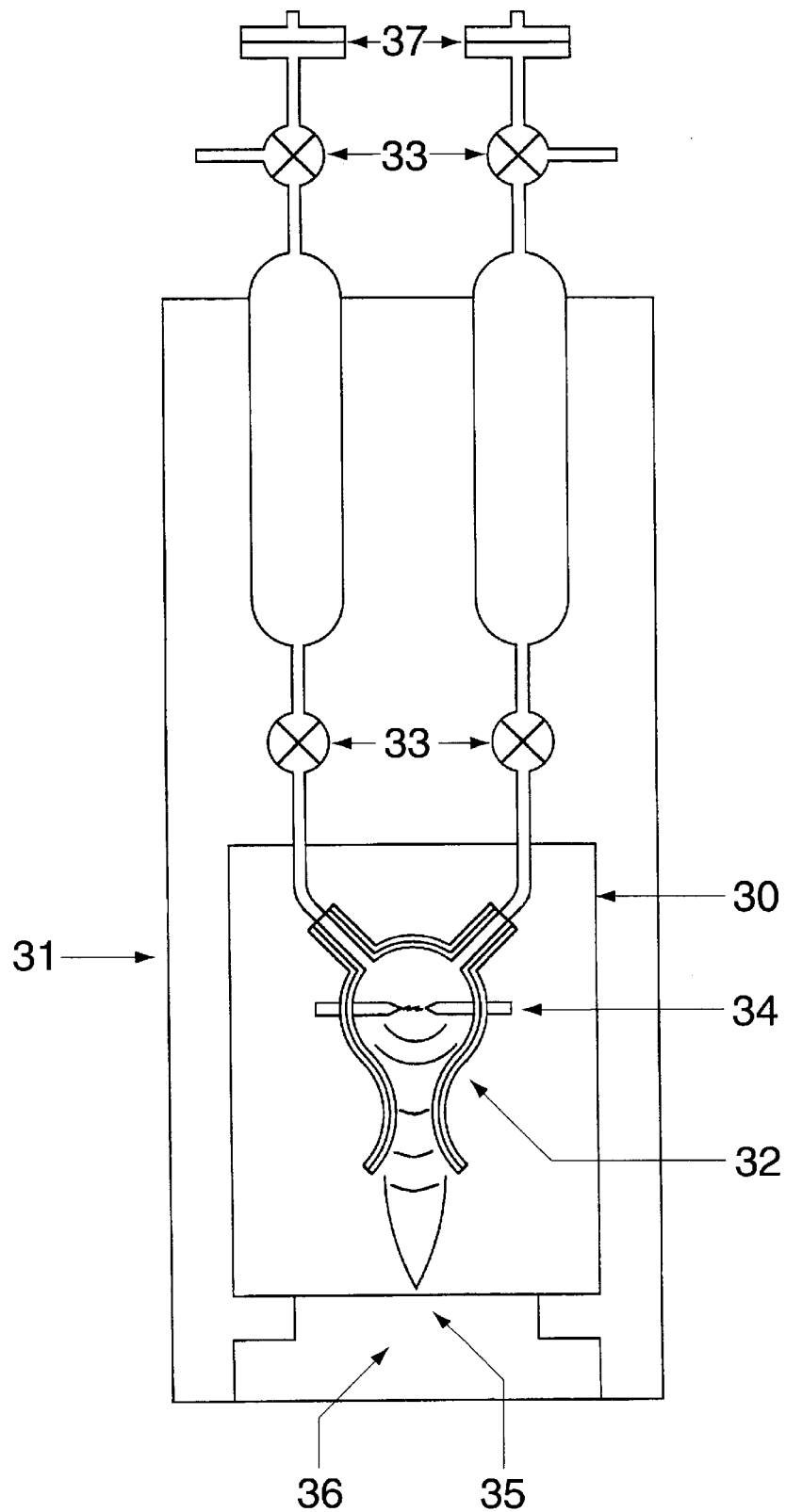
FIG. 6 is an illustration of the microgenerator used as a micro detonator.

The microgenerator when used as a detonator system-uses the concentrated heat generated from the microgenerator to deliver sufficient energy to the surface of an explosive detonator to cause ignition of that detonator. Referring to FIG. 6, the detonator system 30 is typically embedded in a structure 31 which does not permit unwanted energy to be admitted to the surface of the detonator. Positioned at the surface of the embedded detonator is the microgenerator 32 that, when activated, delivers highly concentrated energy to the surface 35 of the detonator which is sufficient to start the detonation process. The random mixing of combustible fuels and their subsequent ignition would not provide the intense energy density to the detonator surface required for detonation. Only the mixing, ignition, and directed delivery of heated gases provided by the microgenerator would be sufficient to deliver the required energy density needed to start an intended detonation. Unique signal control functions would be used for control of the input gas valving 33 and the operation of the internal ignitor 34 in the microgenerator 32. Here pressurized gasses are delivered to the combustion chamber of the microgenerator where they are subsequently ignited. Hot escaping gases flow through the exit nozzle and are directed to the surface 35 of the detonator 36 which can be used to detonate the main explosive (not shown). Over pressure diaphragms 37 can be provided as safety devices to prevent malfunctioning of the gas delivery system to the microgenerator 32.

The forces, torques, and power generated by the microgenerator can be tailored to yield higher force, torque, or power per unit device volume compared to other electrostatic, electromagnetic, or phase-change-based micromotors and microactuators. Devices can be designed to deliver a fixed quantity of energy by using a fixed amount of solid propellant/oxidizer or by timing the delivery when using gas or liquid fuels. The micro device is positioned to the desired location and the fuel/oxidizer is ignited to produce the wanted effect, e.g., tissue cutting for microsurgery.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and the examples be considered as exemplary only, with the true scope and spirit of the invention being indicated in the following claims.

What is claimed is:

1. A micro thrust and heat generator developed using a polysilicon surface micromachining batch-fabricated technique comprising:
    a substrate base comprising at least single crystal silicon material;
    an ignition chamber formed on said substrate base;
    a delivery means formed on said substrate base for providing a fuel source to said ignition chamber;
    an ignition means formed on said substrate base for igniting a fuel source within said ignition chamber; and
    a convergent-divergent nozzle formed on said substrate base and extending outward from said ignition chamber for receiving a high-flow gas stream generated from said ignition means within said ignition chamber.

2. The invention of claim 1 wherein said ignition chamber contains said ignition means and said means for providing a combustion fuel source, and said convergent-divergent nozzle provides an opening for said combustion chamber.

3. The invention of claim 2 wherein said ignition means comprises an electrical ignition element further comprising at least a pair of electrodes located within the ignition chamber whereby said fuel is ignited by an electrical breakdown between said pair of electrodes.

4. The invention of claim 2 wherein said fuel delivery means comprises at least one inlet tube for transporting said fuel source to said ignition chamber.

5. The invention of claim 2 wherein said convergent-divergent nozzle extends outward from said ignition chamber and terminates at an exhaust port opening outside of said ignition chamber whereby the pressure and heat created within the ignition chamber resulting from the combustion of said fuel source by said ignition means accelerates a gas through said convergent-divergent nozzle and through said exhaust pot opening to ambient.

6. The invention of claim 5 wherein said ignition means comprises an electrical ignition element further comprising a pair of electrodes located within the ignition chamber whereby combustible fuel is ignited by an electrical breakdown between said pair of electrodes.

7. The invention of claim 6 wherein said combustible fuel source provided to said ignition chamber by said tube inlet means comprises a gas.

8. The invention of claim 6 wherein said combustible fuel source provided to said ignition chamber by said delivery means comprises a liquid.

9. The invention of claim 5 wherein said ignition means comprises an electrical ignition element further comprising a resistive heating igniter located within said ignition chamber.

10. The invention of claim 9 wherein said fuel source comprises a solid combustible fuel disposed within said ignition chamber for combustion within said ignition chamber.

11. The claim of invention 2 wherein said fuel source comprises a solid combustible fuel disposed within said ignition chamber for combustion within said ignition chamber.

12. The invention of claim 11 wherein said ignition means comprises a resistive heating ignitor.

13. The invention of claim 1 wherein said fuel delivery means, said ignition chamber, and convergent-divergent nozzle are fabricated from a material of the class consisting of polysilicon, silicon carbide, and silicon nitride.

14. The invention of claim 1 wherein said ignition means formed on said substrate base for igniting said fuel source within said ignition chamber comprises a material of the class consisting of tungsten, platinum, nickel, iron, iron-nickel, and alloys thereof.

15. A micro thrust and heat generator for generating heat and propulsion in the microdomain and developed using a polysilicon surface micromachining batch-fabricated technique comprising:

a substrate base;

an ignition chamber formed on said substrate base to contain the combustion of a fuel source;

a delivery means formed on said substrate base for providing a fuel source to said ignition chamber;

an ignition means formed on said substrate base for igniting said fuel source within said ignition chamber; and a converging-diverging nozzle formed on said substrate base and directly extending from said ignition chamber for receiving a high-flow gas stream produced by said ignition means wherein the heat and said gas stream propulsion exits said converging-diverging nozzle to ambient.

16. The invention of claim 15 wherein said fuel source comprises a gas.

17. The invention of claim 15 wherein said fuel source comprises a liquid propellant.

18. The invention of claim 15 wherein said delivery means comprises at least one inlet tube formed on said substrate base for transporting said fuel source to said ignition chamber.

19. The invention of claim 15 wherein said ignition means comprises an electrical element further comprising at least one pair of electrodes formed on said substrate base within said ignition chamber and wherein spontaneous combustion is caused by an electrical breakdown between said pair of electrodes.

20. The invention of claim 19 wherein said electrical ignition means for igniting said fuel source within said ignition chamber further comprises a platinum glow-plug-type catalyst formed on said substrate base.

21. The invention of claim 15 wherein said ignition means for igniting said fuel source within said ignition chamber comprises a resistive heating igniter.

22. The invention of claim 15 wherein said fuel delivery means, said ignition chamber, and convergent-divergent nozzle are fabricated from a material of the class consisting of polysilicon, silicon carbide, and silicon nitride.

23. The invention of claim 15 wherein said ignition means formed on said substrate base for igniting said fuel source within said ignition chamber comprises a material of the class consisting of tungsten, platinum, iron, nickel, iron-nickel, and alloys thereof.

\* \* \* \* \*